(12) United States Patent
Eitane et al.

(10) Patent No.: US 10,838,157 B1
(45) Date of Patent: Nov. 17, 2020

(54) BIDI QSFP

(71) Applicant: RAD DATA COMMUNICATIONS LTD., Tel Aviv (IL)

(72) Inventors: Tsvi Eitane, Netanya (IL); Ilan Fish, Givatayim (IL)

(73) Assignee: RAD DATA COMMUNICATIONS LTD., Tel Aviv (IL)

( * ) Notice: Subject to any disclaimer, the term of this patent is extended or adjusted under 35 U.S.C. 154(b) by 0 days.

(21) Appl. No.: 16/553,214

(22) Filed: Aug. 28, 2019

(51) Int. Cl.
 *G02B 6/42* (2006.01)
 *H04B 10/40* (2013.01)
 *G02B 6/27* (2006.01)

(52) U.S. Cl.
 CPC ......... *G02B 6/4246* (2013.01); *G02B 6/2706* (2013.01); *G02B 6/2746* (2013.01); *H04B 10/40* (2013.01)

(58) Field of Classification Search
 CPC .. G02B 6/4246; G02B 6/2706; G02B 6/2746; G02B 6/3817; G02B 6/3885; G02B 6/3893; H01R 13/62983; H01R 13/62938
 USPC ...................................... 385/88–92
 See application file for complete search history.

(56) References Cited

U.S. PATENT DOCUMENTS

| 4,272,159 A | 6/1981 | Matsumoto |
| 4,464,022 A | 8/1984 | Emkey |
| 2005/0018967 A1* | 1/2005 | Huang ............... G02F 1/093 385/39 |
| 2011/0081807 A1* | 4/2011 | Rephaeli ............ G02B 6/4274 439/620.21 |
| 2015/0078746 A1* | 3/2015 | Spock ................ H04L 41/12 398/45 |

OTHER PUBLICATIONS

SFF Committee INF-8438i Specification for QSFP (Quad Small Form Factor Pluggable) Transceiver, Rev 1.0 Nov. 2006.
IEEE 802.3-2018 (Revision of 802.3-2015) IEEE Standard for Ethernet Section 6 (clauses 80 and 88).

* cited by examiner

*Primary Examiner* — Michael P Mooney
(74) *Attorney, Agent, or Firm* — A.C. Entis-IP Ltd.; Allan C. Entis; Kenichi N. Hartman

(57) ABSTRACT

A two-fiber Quad Small Form-factor Pluggable electro-optical transceiver (QSFP) currently connects to two optical fibers, one for transmission and one for reception. In accordance with an embodiment of the disclosure, a three-port optical circulator may be employed in order to achieve bidirectional transmission (BiDi) on a single fiber. The disclosure provides in accordance with an embodiment of the disclosure a miniature optical circulator that clips onto the two-fiber QSFP without protruding from the QSFP extraction lever, and is configured to mate with the two QSFP fiber connectors on one side and a single optical fiber on the other. Another embodiment provides an integrated bidirectional QSFP that is configured to mate with a single bidirectional fiber.

9 Claims, 4 Drawing Sheets

BIDI QSFP

BACKGROUND

A Quad Small Form-factor Pluggable electro-optical transceiver, commonly referred to by its acronym "QSFP", comprises four lasers driving four optical transmit lanes and four photodiodes to receive signals from four optical receive lanes. A two-fiber QSFP transceiver additionally comprises an optical multiplexer configured to multiplex the four optical transmit lanes onto a single transmit optical fiber, and an optical demultiplexer configured to demultiplex the four optical receive lanes from a single receive optical fiber.

A QSFP28, which is an example of a conventional two-fiber QSFP transceiver, is configured to achieve 100 gigabits per second (Gbps) by transmitting and receiving 25 Gbps on each of the four lanes (the nomenclature "28" refers to a physical line rate of 28 Gbps which is somewhat higher than the effective date rate of 25 Gbps).

An electrical side of the QSFP transceiver is configured to plug into a QSFP cage, which is typically comprised in a switch or a router. An optical side of the two-fiber QSFP transceiver comprises a receive optical connector and a transmit optical connector. The receive optical connector is configured to optically connect the receive optical fiber comprised in the QSFP transceiver to a first external optical fiber for reception of incoming optical signals. The transmit optical connector is configured to optically connect the transmit optical fiber comprised in the QSFP transceiver to a second external optical fiber for transmission of optical signals.

SUMMARY

An aspect of an embodiment of the disclosure relates to providing an optical converter configured to connect to receive and transmit optical connectors of a conventional two-fiber QSFP transceiver, for converting the QSFP transceiver to be operable to receive and transmit optical signals bidirectionally (BiDi) over a single optical fiber. For convenience of presentation, an optical converter in accordance with an embodiment of the disclosure may be referred to herein as a "BiDi converter".

In an embodiment of the disclosure, the BiDi converter comprises a three-port optical circulator configured to direct optical signals from the BiDi optical fiber connector to the receive optical connector of the QSFP transceiver and direct optical signals from the transmit optical connector of the QSFP transceiver to the BiDi optical fiber connector.

Optionally, the BiDi converter is dimensioned to have a maximum length so as not to protrude from an extraction lever of the QSFP transceiver, to have a maximum width that is less than or equal to a width of the QSFP transceiver, and to have a maximum height that is less than or equal to a height of the QSFP transceiver.

Another embodiment of the disclosure relates to providing an improved QSFP transceiver configured to be directly connectable with, as well as receive and transmit optical signals through, a single optical fiber. An improved QSFP in accordance with an embodiment of the disclosure maybe referred to herein as a "BiDi QSFP". The electrical side of a BiDi QSFP transceiver is configured to plug into a QSFP cage. The optical side of the two-fiber QSFP transceiver comprises a single bidirectional optical connector.

In an embodiment of the disclosure, a BiDi QSFP comprises a conventional QSFP transceiver and a BiDi converter in accordance with an embodiment of the disclosure that is permanently attached and/or bonded to the conventional QSFP transceiver.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
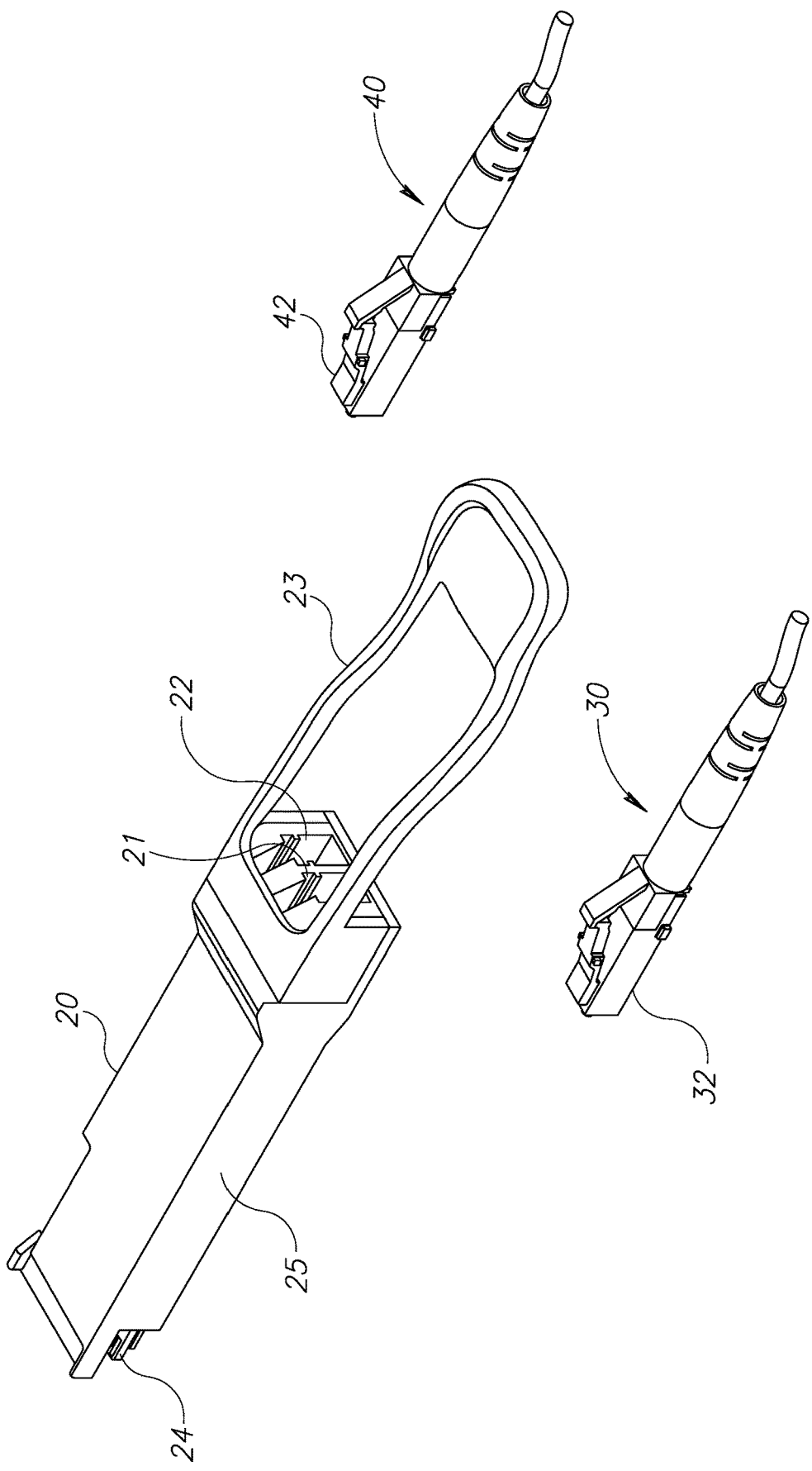
FIG. 1 schematically shows a conventional two-fiber QSFP transceiver.

FIG. 1 schematically shows a conventional two-fiber QSFP transceiver 20 comprising a transmit connector 21 for mating with an optical fiber connector 32 of an external transmit optical fiber 30 over which optical signals are transmitted by the transceiver, and a receive connector 22 for mating with an optical fiber connector 42 of an external receive optical fiber 40 from which optical signals are received by the transceiver. QSFP transceiver 20 further comprises an edge connector 24, which has conductive contacts that are electrically connected to circuitry (not shown) in the QSFP transceiver. The QSFP transceiver is shaped to be plugged into a QSFP cage socket (not shown) of a cage (not shown), which is configured to receive connector 52 and connect the conductive contacts of the edge connector to matching conductive contacts in the cage socket, and thereby to electrically connect the QSFP transceiver to circuitry in the cage. The QSFP transceiver further comprises opto-electronic components (not shown) housed within a conventional QSFP housing 25 suitable for insertion into a conventional QSFP cage. The opto-electrical components of a two-fiber QSFP transceiver are configured to (1) convert electrical signals received from edge connector 52 into four optical signals called transmit lanes and multiplex these lanes for transmission over the single transmit optical fiber 30 through transmit connector 21; and (2) demultiplex four optical signals received from receive optical fiber 40 through receive connector 22 into four optical receive lanes and convert these lanes into electrical signals for transmission through edge connector 52.

Figure 2:
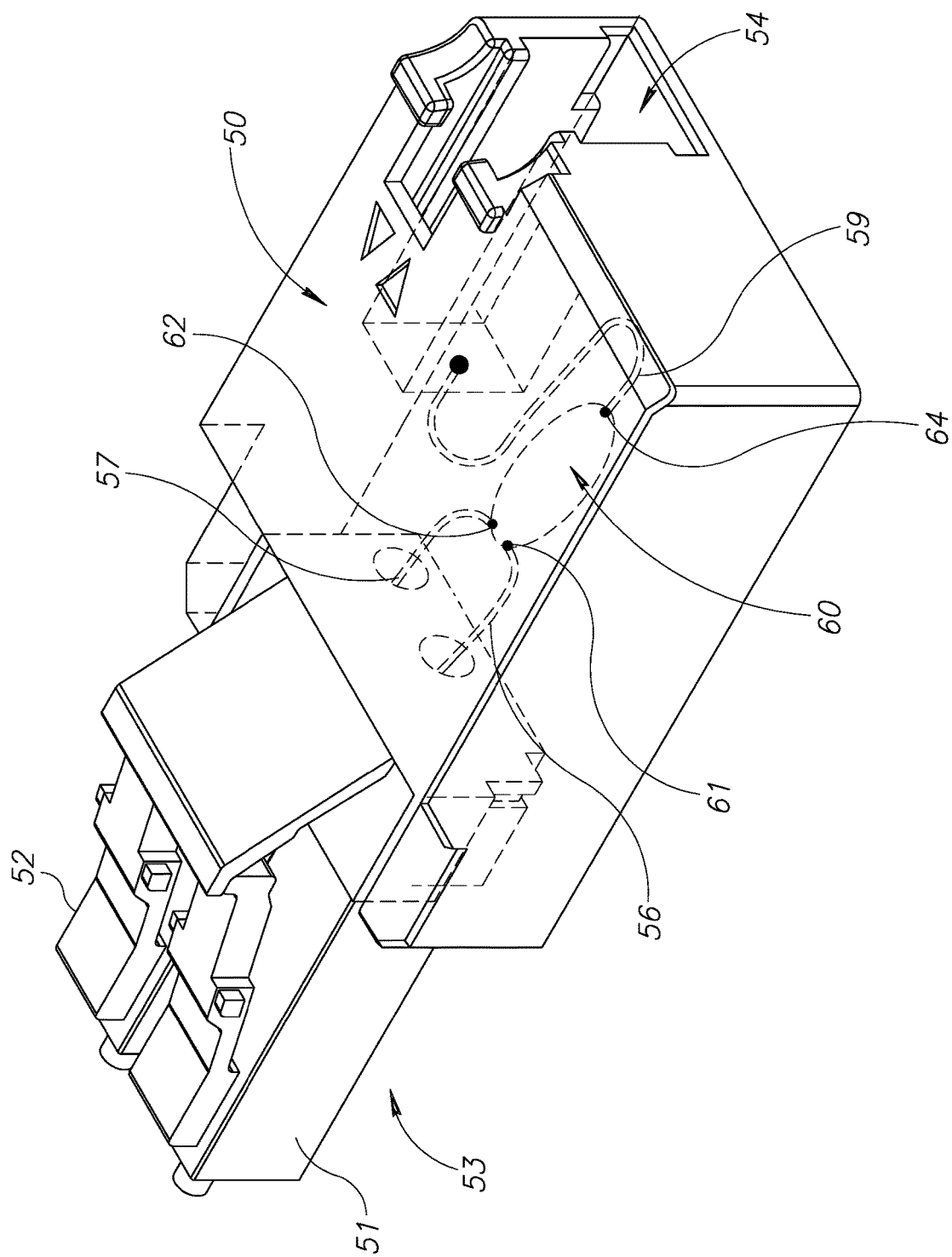
FIG. 2 schematically shows a BiDi converter in accordance with an embodiment of the invention.
Figure 3A:
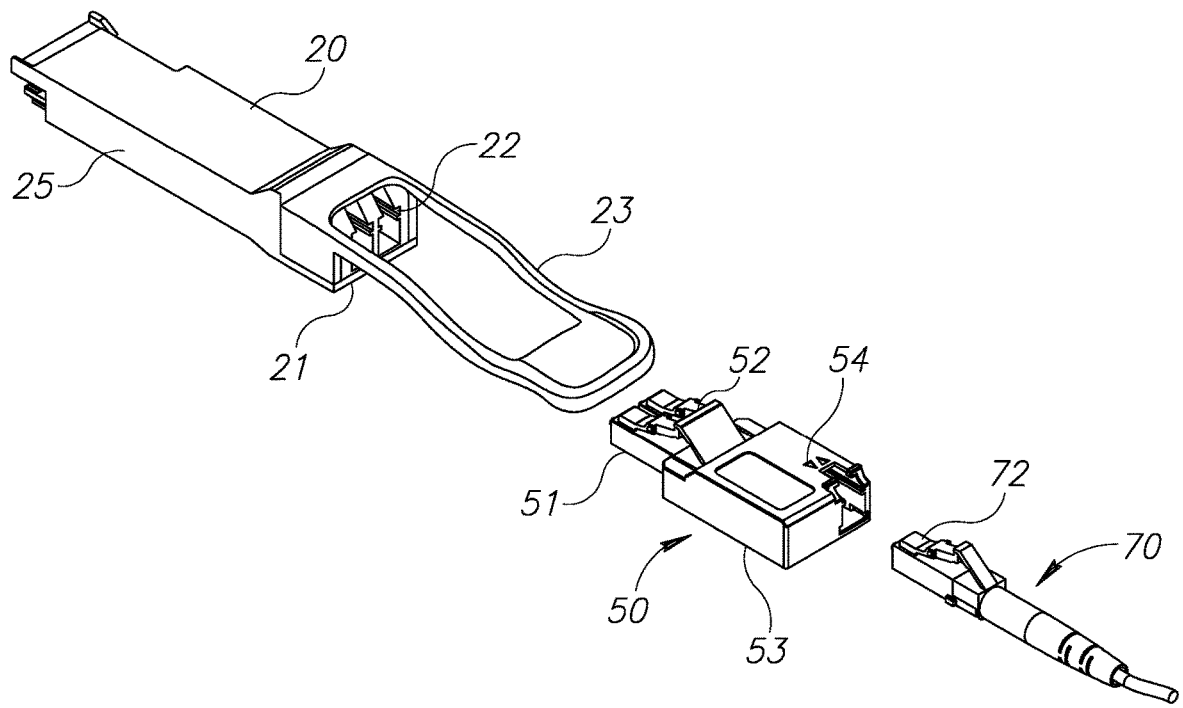
FIG. 3A and FIG. 3B schematically show a conventional two-fiber QSFP transceiver together with a BiDi converter in accordance with an embodiment of the invention.
Figure 3B:
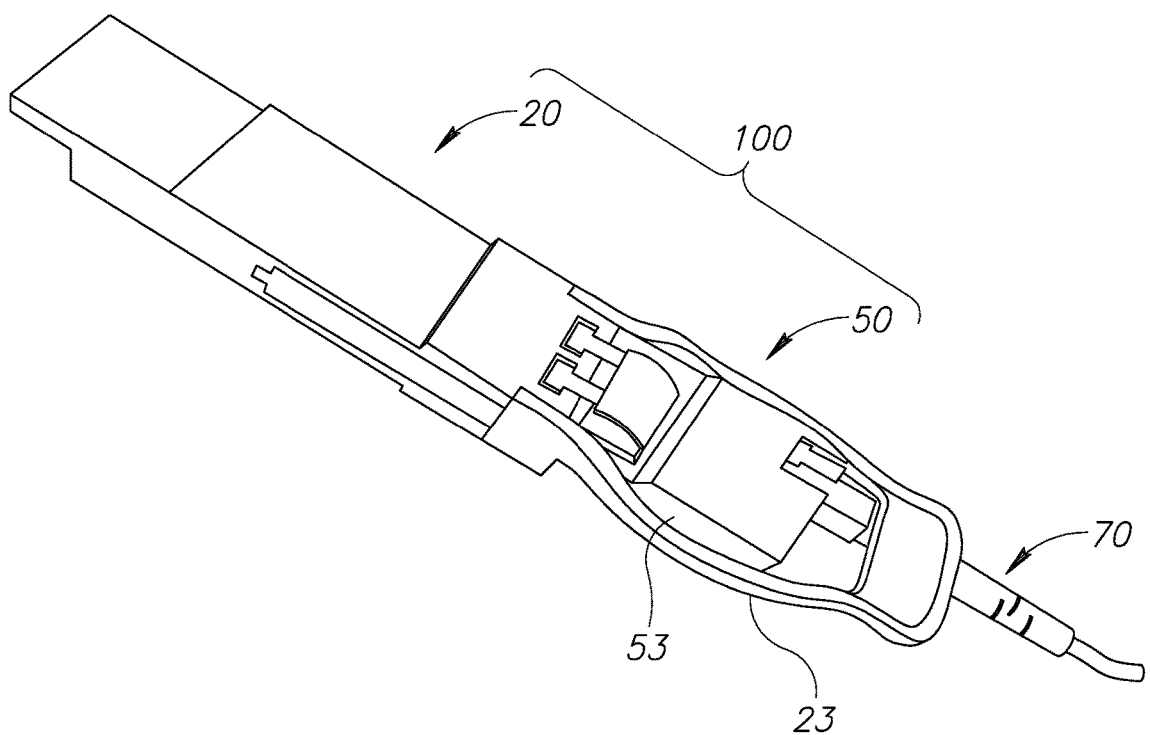

FIGS. 2 and 3A-3B show a clip-on BiDi converter 50 in accordance with an embodiment of the disclosure that is configured to be connectable with transmit connector 21 and receive connector 22 of a conventional QSFP transceiver 20, and to combine signals that conventionally travel separately in input optical fiber 40 and output optical fiber 50 respectively so that the signals can be carried by a single optical fiber 70 connected to the BiDi converter. FIG. 3B schematically shows a BiDi QSFP converter 120 in accordance with an embodiment of the invention, comprising Bidi converter 50 connected to QSFP transceiver 20.

BiDi converter 50 optionally comprises a QSFP connector bank 53 comprising: (1) transmit connector 51 configured to mate with transmit connector 21 of QSFP transceiver 20; and (2) a receive connector 52 configured to mate with receive connector 22 of QSFP transceiver 20. The BiDi converter also comprises a BiDi connector 54 for receiving and mating with an optical fiber connector 72 of BiDi optical fiber 70. Transmit connector 51 may be shaped and configured identically, or functionally equivalent, to optical fiber connector 32 of conventional output optical fiber 30. Receive connector 52 may be shaped and configured identically, or functionally equivalent, to optical fiber connector 42 of conventional input optical fiber 40.

BiDi converter 50 additionally comprises a three-port optical circulator 60 that is operatively connected to transmit connector 51, receive connector 52, and BiDi connector 54. Three port optical circulators are optical devices that may be composed of a variety of optical components (by way of example birefringent crystals, Faraday rotators, and half-wave-plates) configured to direct optical signals from one port to another port, in a desired direction, preventing signals from propagating in unintended directions. Optical circulator 60 may comprise three ports: output port 61 that is optically connected to transmit connector 51 via internal optical fiber 56, an input port 62 that is optically connected to receive connector 52 via internal optical fiber 57, and a BiDi port 64 that is optically connected to BiDi connector 54 via internal optical fiber 59. Optical circulator 60 may be configured to perform its functionality for all optical lanes served by QSFP transceiver 20, including four optical transmit lanes and four optical receive lanes. As a consequence of how optical circulator 60 is connected to internal optical fibers 56, 57, and 59, the optical circulator is configured to receive optical inputs through output port 61 and BiDi port 64. Optical circulator 60 is configured so that these optical signals (received through output port 61 or BiDi port 64) can be transmitted in only the following two directions: (1) from output port 61 to BiDi port 64; and (2) from BiDi port 64 to input port 62.

There are many configurations for implementing optical circulators in the prior art, and an embodiment of the present disclosure optionally applies to any one of the prior art configurations. In one configuration, light from the transmit port passes through a first birefringent crystal, a first half-wave plate, a first Faraday rotator, a second birefringent crystal, a second Faraday rotator, a second half-wave plate, and a third birefringent crystal, in that order. Each of these optical components mandates a certain minimum size along the light path, for example, the Faraday rotator's length is specified by the magnetic field and the requirement for 45 degree rotation, and the birefringent crystal's length derives from a required horizontal displacement of output and input ports of the optical circulator, for the ports to be compatible with the horizontal displacement between transmit connector 21 and receive connector 22.

In conventional optical circulators these optical components are positioned along a straight line one after the other, and thus require a certain minimum length. Although the polarization directions are most easily specified in such a straight-line geometry, the same effect may be attained with a curved geometry, as long as these polarization directions are taken into account. For example, the optical components may be positioned so that the light's overall path may be circular, or may traverse multiple circles, as long as the overall displacement of the polarized light components is maintained.

As can be seen in FIGS. 3A and 3B, BiDi converter 50 is optionally dimensioned to fit inside extraction lever 23 when clipped onto QSFP transceiver 20. As a result, overall length of the QSFP including extraction lever advantageously remains unchanged, and the extraction lever continues to function as before. The action of clipping BiDi converter 50 onto the QSFP transceiver is advantageously straightforward and can even be performed with the QSFP transceiver inside its cage. The BiDi converter optionally is shaped to have a maximum width that is less than or equal to a width of a conventional QSFP transceiver, and a maximum height that is less than or equal to a height of a conventional QSFP transceiver.

Optionally, transmit connector 51 and receive connector 52 are configured to be securely but removably connected to corresponding connectors (transmit connector 21 and received connector 22) of QSFP transceiver 20, so that BiDi converter 50 is able to be clipped on and off QSPF transceiver 20 as needed. Alternatively, transmit connector 51 and receive connector 52 are configured to be securely and permanently connected to corresponding connectors so that once BiDi converter 50 is clipped on to QSFP transceiver 20, the BiDi converter cannot be removed.

Whereas FIG. 3B shows BiDi converter 50 clipped onto and connected with conventional QSFP transceiver 20 to thereby form BiDi QSFP transceiver 100, the disclosure also provides for an integrated BiDi QSFP transceiver in which a BiDi converter in accordance with an embodiment of the disclosure is integrally associated with a QSFP transceiver, so that the integrated QSFP transceiver is operable to receive and transmit optical signals from a single optical fiber.

Figure 4:
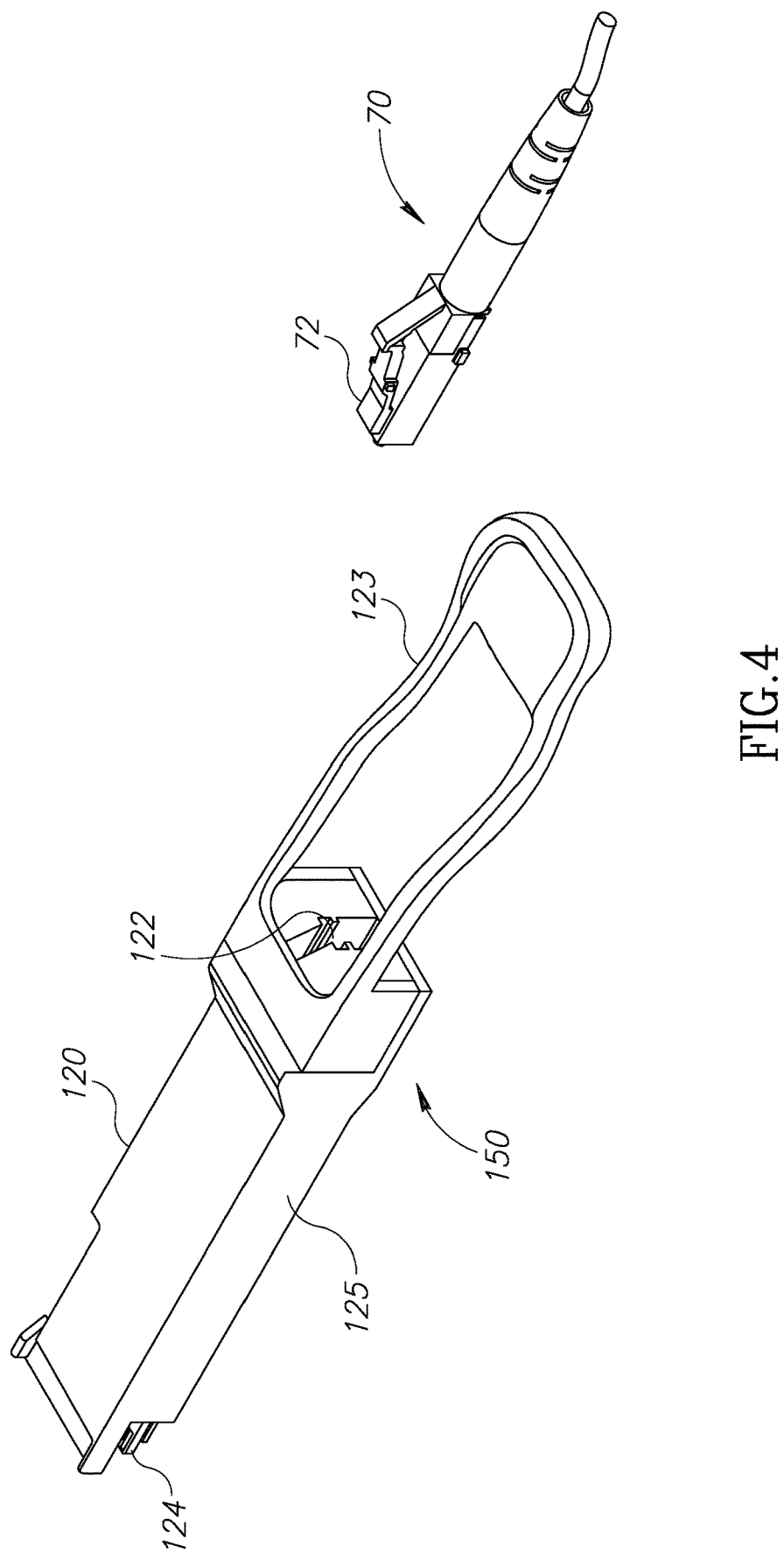
FIG. 4 schematically shows a BiDi QSFP in accordance with an embodiment of the invention.

As shown in FIG. 4, an integrated BiDi QSFP transceiver 120 in accordance with an embodiment of the disclosure may comprise a BiDi converter 150, comprising an optical circulator (not shown) and a BiDi connector 122 for receiving and mating with an optical fiber connector 72 of BiDi optical fiber 70. BiDi converter 150 is optionally housed within a housing 125 that is compatible with a conventional QSFP cage socket (not shown), so that conductive contacts of edge connector 124 can connect to matching conductive contacts in the cage socket, and thereby electrically connect integrated BiDi QSFP transceiver 120 to circuitry in the cage. Integrated BiDi QSFP transceiver 120 may be dimensioned to be essentially equivalent to a conventional QSFP transceiver, by way of example having a width equal to the width of a conventional QSFP transceiver, having a height equal to the height of a conventional QSFP transceiver, and having a length to the end of extraction lever 123 equal to that of a conventional QSFP transceiver.

In an embodiment of the disclosure, a BiDi QSFP comprises a conventional QSFP transceiver and a BiDi converter in accordance with an embodiment of the disclosure that is permanently attached and/or bonded to the conventional QSFP transceiver. In an embodiment of the disclosure, the optical lanes of the two-fiber QSFP connect directly to the BiDi converter without connectors 21, 22, 51, and 52.

There is therefore provided in accordance with an embodiment of the disclosure an apparatus comprising: a transmit connector configured to mate with an optical transmit connector of a conventional QSFP transceiver; a receive connector configured to mate with an optical receive connector of a conventional QSFP transceiver; a bidirectional connector configured to mate with a connector of a bidirectional optical fiber; a housing that is fixedly connected to or integral with the transmit connector, the receive connector, and the bidirectional connector; and an optical circulator housed within the housing and configured to direct optical signals received from the bidirectional connector to the receive connector; and direct optical signals received from the transmit connector to the bidirectional connector. Optionally, the BiDi converter is dimensioned to have a maximum length so as not to protrude from an extraction lever of the conventional QSFP transceiver when connected to the conventional QSFP transceiver. Optionally, the BiDi converter is shaped to have a maximum width that is less than or equal to a width of a conventional QSFP transceiver, and a maximum height that is less than or equal to a height of a conventional QSFP transceiver.

There is also provided in accordance with an embodiment of the disclosure an opto-electric transceiver comprising: a housing suitable for insertion into a conventional QSFP cage; an edge connector configured to be compatible with electrical contacts comprised in the conventional QSFP cage; a bidirectional connector configured for mating with a connector of a bidirectional optical fiber; and an optical circulator housed within the housing and configured to direct optical signals received at the bidirectional connector to be converted into electric signals for transmission to the edge connector, and direct optical signals generated responsive to electric signals received by the edge connector to the bidirectional connector. Optionally, the opto-electric transceiver is dimensioned to have a width equal to a width of a conventional QSFP transceiver, and a height that equal to a height of a conventional QSFP transceiver.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An apparatus comprising:
an optical circulator;
a bidirectional optical connector optically connected to the optical circulator and configured to mate with a connector of a bidirectional optical fiber; and
a pair of unidirectional optical connectors optically connected to the optical circulator and configured to readily attach to corresponding unidirectional optical connectors of a conventional QSFP transceiver,
wherein the apparatus is dimensioned to have a maximum length so as not to protrude from an extraction lever of the conventional QSFP transceiver when attached to the conventional QSFP transceiver.

2. The apparatus according to claim 1, wherein the apparatus is shaped to have a maximum width that is less than or equal to a width of a conventional QSFP transceiver, and a maximum height that is less than or equal to a height of a conventional QSFP transceiver.

3. The apparatus according to claim 1, wherein:
the pair of unidirectional optical connectors comprises a receive connector and a transmit connector; and
the optical circulator is configured to direct optical signals received from the bidirectional optical connector to the receive connector and direct optical signals received from the transmit connector to the bidirectional connector.

4. The apparatus according to claim 1 comprising a housing, wherein:
the optical circulator is housed within the housing;
the bidirectional connector is fixed to a first side of the housing; and
the pair of unidirectional optical connectors is fixed to a second side of the housing opposite the first side.

5. A bidirectional QSFP transceiver system comprising:
a QSFP transceiver comprising:
a housing suitable for insertion into a conventional QSFP cage;
an edge connector configured to be compatible with electrical contacts comprised in the conventional QSFP cage; and
a first pair of unidirectional optical connectors;
a BiDi converter comprising:
an optical circulator;
a bidirectional optical connector optically connected to the optical circulator and configured to mate with a connector of a bidirectional optical fiber; and
a second pair of unidirectional optical connectors optically connected to the optical circulator and configured to readily attach to the first pair of unidirectional optical connectors comprised in the QSFP transceiver,
wherein the apparatus is dimensioned to have a maximum length so as not to protrude from an extraction lever of the conventional QSFP transceiver when attached to the conventional QSFP transceiver.

6. The system according to claim 5, wherein the BiDi converter is shaped to have a maximum width that is less than or equal to a width of the QSFP transceiver, and a maximum height that is less than or equal to a height of the QSFP transceiver.

7. The system according to claim 5, wherein:
the second pair of unidirectional optical connectors comprised in the BiDi converter comprises a receive connector and a transmit connector; and
the optical circulator is configured to direct optical signals received from the bidirectional connector to the receive connector and direct optical signals received from the transmit connector to the bidirectional connector.

8. The system according to claim 5 wherein:
the BiDi converter comprises a housing;
the optical circulator is housed within the housing;
the bidirectional connector is fixed to a first side of the housing; and
the second pair of unidirectional optical connectors is fixed to a second side of the housing opposite the first side.

9. The system according to claim 5, wherein the BiDi converter is attached to the QSFP transceiver.

* * * * *